Figure 1:
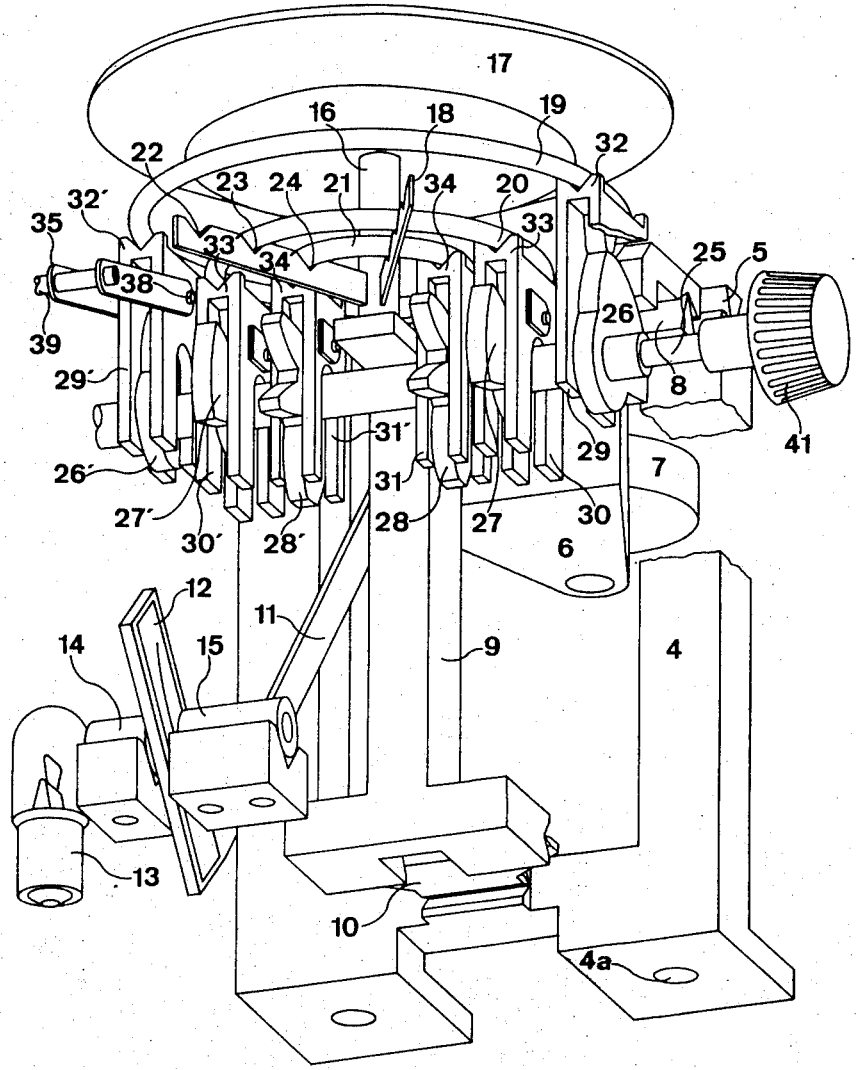

United States Patent

Buchmann

[15] 3,700,056
[45] Oct. 24, 1972

[54] TOP LOADING PRECISION BALANCE HAVING ANNULAR WEIGHTS

[72] Inventor: Hans Buchmann, Oetwil, Switzerland

[73] Assignee: Mettler Instrumente A.G., Greifensee-Zurich, Switzerland

[22] Filed: Aug. 12, 1971

[21] Appl. No.: 171,093

[30] Foreign Application Priority Data

Aug. 26, 1970  Switzerland............12766/70

[52] U.S. Cl..............................177/237, 177/248
[51] Int. Cl. .............................G01g 1/28, G01g 1/26
[58] Field of Search........177/237, 246, 248, 250, 252

[56] References Cited

UNITED STATES PATENTS

| | | | |
|---|---|---|---|
| 2,764,400 | 9/1956 | Mettler | 177/191 |
| 3,004,618 | 10/1961 | Meler | 177/248 |
| 3,026,954 | 3/1962 | Appius | 177/248 |
| 3,495,669 | 2/1970 | Yeager et al | 177/248 X |

Primary Examiner—Edward B. Wilkinson
Assistant Examiner—George H. Miller, Jr.
Attorney—Kelman & Berman

[57] ABSTRACT

A top loading precision balance having a weighing pan held horizontal by a parallelogram linkage is provided with a set of coaxial, annular weights mounted on the stem of the pan above the secondary or suspension pivot which connects the balance beam with a vertical pan carrier member of the linkage. The weights may be lifted from the stem of the pan in any desired combination by means of lifters operated by cams on a single control shaft, but remain coaxial in all positions, their common axis passing through the center of the pan and being laterally offset from the upright pan carrier, which is parallel to a stationary support member in the parallelogram linkage.

11 Claims, 3 Drawing Figures

TOP LOADING PRECISION BALANCE HAVING ANNULAR WEIGHTS

This invention relates to top loading precision balances and particularly to a precision balance in which the weighing range is selected by moving built-in weights between a loading position in which they load the pan carrier and an inoperative position in which they are lifted from the carrier, the pan carrier being an element of a parallelogram linkage which keeps the pan horizontal in all operating conditions of the balance.

In its more specific aspects, the invention is concerned with an improvement in the precision balance disclosed in U.S. Pat. No. 3,193,036. The pan of the known balance is mounted on top of a frame which forms one member in each of two parallelogram suspensions also including respective balance beams, stationary support elements, and steering or control links. The weighing range of the balance is selected by means of cam-operated levers which move weights between a loading position and an inoperative position. In the loading position, the weights load the frame near one or the other of the parallelogram linkages.

It is inherent in the known device that the frame is often loaded asymmetrically, and the two main bearings which respectively connect the pan carrying frame to the balance beams are unevenly loaded, and thus wear unevenly.

Additionally, the heavy weights cause sufficient elastic deformation of the parallelogram linkages, and particularly of the pan carrying frame, to upset the precise alignment of the linkage elements. These shortcomings of the known balance have been mitigated to some extent by the provision of resilient shock absorbers in the balance structure, but at increased cost.

It has been proposed in U.S. Pat. No. 3,004,618 to provide an analytical balance with annular weights mounted on the suspension system of the balance pan below the secondary or suspension pivot, and with a mechanism for lifting the weights, and such a system is inherently free of asymmetry and its consequences when the annular weights are coaxially arranged in all positions, and their common axis passes through the pivot axis of the suspension bearing.

The annular weights were not considered heretofore suitable for top loading precision balances although they have been known for more than a decade. The known weights and their operating mechanism cannot be incorporated in a top-loading balance without greatly increasing the bulk of the balance, and compactness is an important feature in a top-loading balance in which the pan is arranged above the secondary pivot axis and held horizontal by a parallelogram linkage. Moreover, the weighing ranges of such top-loading balances are much wider than those of analytical balances, and the weights employed must be correspondingly heavier and larger, jointly amounting to well over one pound and more by an order of magnitude than the range of an analytical balance. It did not appear feasible to provide for the necessary optical indicating system for fractional weighings in the presence of the bulky weights and their operating mechanism. Moreover, mounting heavy annular weights on a pan carrier of a top loading balance would overcome the assymmetry problem, but would still not solve the problems resulting from elastic deformation of the carrier which is an element of the parallelogram linkage.

It has now been found that annular weights of the type known from the afore-described analytical balance may be applied successfully to a top-loading precision balance if the weights are arranged outside of the parallelogram linkage, and above the secondary or suspension pivot which connects the balance beam to the pan carrier, the parallelogram linkage being completed by a link downwardly spaced from the main pivot axis between the balance beam and a stationary support and the afore-mentioned secondary pivot axis. The weights as well as the weighing pan are mounted on the pan carrier above the secondary pivot axis.

Figure 3:
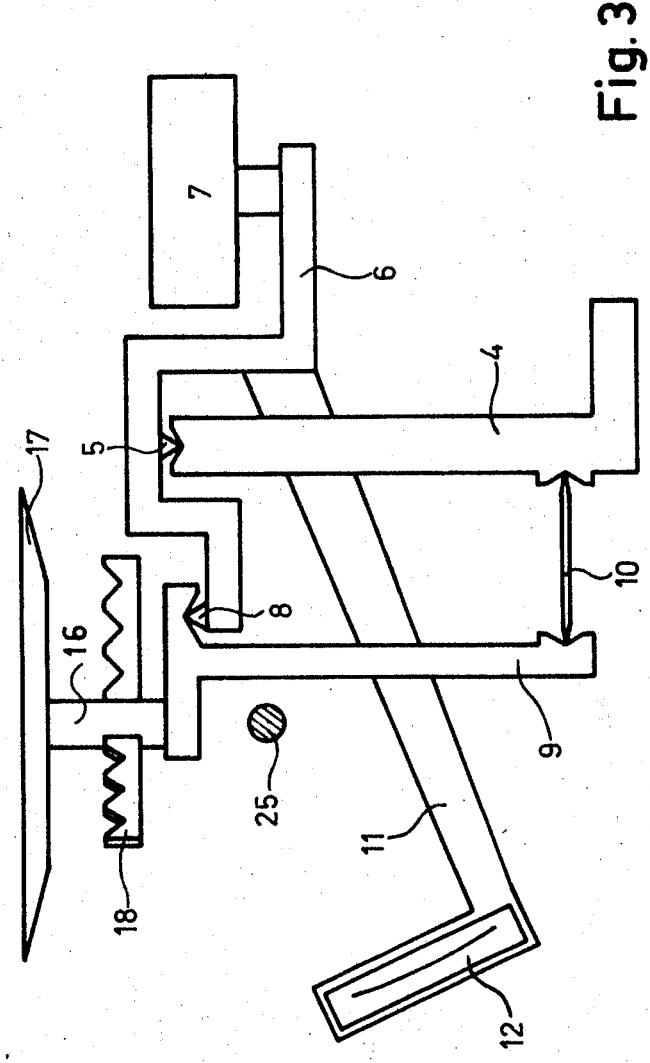

Other features, additional objects, and many of the attendant advantages of this invention will readily become apparent as the invention is better understood by reference to the following detailed description of preferred embodiments when considered in connection with the appended drawing in which:

FIG. 1 shows a precision balance of the invention in a fragmentary perspective view;

2 shows a modified detail for use in the balance of FIG. 1 fragmentary side elevation, and partly in section; and FIG. 3 illustrates selected elements of the balance of FIG. 1 in side elevation, and partly in section.

Referring now to the drawing, and initially to FIGS. 1 and 3, there is shown only as much of an otherwise conventional precision balance as is needed for an understanding of the invention, the omitted parts of the balance including a housing, the zero point adjustment, levelling devices, and the like. The balance is shown in its normal operating position.

The illustrated portion of the normally stationary support structure consists of a heavy unitary bracket 4 including two upright columns, and formed with openings 4a in its base for fastening to the balance housing. A balance beam 6 is suspended on knife edge bearings 5 on the top surfaces of the columns 4, only one main bearing arrangement being seen in the drawing. One arm of the beam 6 carries a counterweight 7, and the other arm is provided with a knife edge 8. The knife edge 8 provides a secondary or suspension bearing for an approximately T-shaped pan carrier 9 whose stem is upright, the knife edge 8 engaging a bearing notch on the underside of one arm of the cross bar 9' which constitutes the topmost part of the carrier 9.

Two knife edges of a horizontally extending link 10 engage respective V-shaped bearing faces near the lower ends of the pan carrier and the bracket 4, the effective length of the link 10 being equal to the distance between the knife edges 5,8 so that the longitudinal axis of the carrier 9 remains parallel to itself and vertical in all operative angular positions of the beam 6. The bracket 4, carrier 9, spreader 10, and one arm of the beam 6 constitute, in effect, a parallelogram linkage.

A slim metal strip 11 is attached to the arm of the heavy beam 6 carrying the counterweight 7, passes between the two columns of the bracket 4 and clears the bar 9. The free end of the strip 11 carries an engraved transparent scale 12 which moves between a light source consisting of a projector lamp 13 and a condenser 14 and the objective lens 15 of a projector system so that the angular position of the beam 6 is indicated by the image of the indicia of the scale 12 on a screen on the balance housing (not shown) carrying a fixed index mark, as is conventional in itself.

The other arm of the cross bar 9' on the carrier 9 which is directed away from the bracket 4 carries the fixed, central, vertical stem 16 of a circular weighing pan 17, the pan being the only element of the illustrated structure described so far which is exposed outside the non-illustrated balance housing. Horizontal, radial arms 18 are fixedly fastened to the stem 16 adjacent the cross bar 9' in angularly offset relationship. Three weights 19,20,21, respectively weighing 400, 200, and 100 grams, and of toroidal shape differ in their diameters so that they may be received simultaneously in notches 22,23,24, spaced radially along each of the several arms 18 in coaxial arrangement about the axis of the cylindrical stem 16 in a common horizontal plane. A load obscured by the pan 17 in FIG. 1 and not shown in FIG. 3 weighs somewhat more than 400 g, and the illustrated equilibrium position of the beam 6 and of the elements connected therewith is achieved in part by the weight 19 being lifted from the notches 22. The mechanism supporting the weight 19 and also capable of supporting the weights 20,21 is functionally similar to the corresponding device shown in the afore-mentioned U.S. Pat. No. 3,004,618.

A horizontal control shaft 25 is journaled in the non-illustrated portion of the supporting structure in vertical alignment with the stem 16 for rotation about an axis parallel to the pivot axes of the main bearing 5 and the secondary or suspension bearing 8. Three pairs of identical, radial cams 26, 26'; 27,27'; and 28,28' are fixedly mounted on the shaft 25 and cooperate with respective identical lifters 29,29'; 30,30'; 31,31'.

Each lifter includes two plates perpendicular to the axis of the shaft 25 and provided with downwardly open slots in which the shaft 25 is received with sufficient clearance to permit free vertical movement of the lifter between a first position in which the shaft is located at the upper end of the slots, and second position in which the closed upper end of each slot is upwardly spaced from the shaft 25. The two plates of the lifter are spaced from each other sufficiently to receive the associated cam therebetween and the upper ends of the two plates are connected by a transverse top plate which gives each lifter an approximately U-shaped cross section in an upright plane including the axis of the shaft 25.

The top plates of the six lifters carry each a pair of V-notched cradles 32,33,34,32',33',34'. Each lifter is suspended by two links from the non-illustrated portion of the supporting structure, only a fixed common pivot pin 39 for the two links 35 of the lifter 29' being shown in FIG. 1. The ends of the links 35 remote from the pivot pin 39 are secured to the two plates of the lifter 29' near its top plate and near the cradles 32' arranged on the same by respective pivot pins 38. The lifter 29' is thus guided by the links 35 and the shaft 25 in a path which deviates only insignificantly from a straight vertical line.

In the position of the apparatus shown in 1, the cams 26,26' engage fixed projections depending from the top plates of the associated lifters 29,29', only a projection 36 being visible on the lifter 29, partly broken away to shown the projection. The camming engagement of the cams 26,26' with the projections 36 causes the lifters 29,29' to be raised into their second positions in which their cradles 32,32' receive diametrically opposite parts of the annular weight 19 and keep it above the notches 22 of the arms 18. Only the weights 20,21 are in their loading positions in which they rest on the arms 18 and may be lifted from the arms 18 and the stem 16 into their inoperative positions by engagement of the other cams with the associated lifters.

The lifters straddle the shaft 25 and the associated cams with minimal clearances permitting free relative movement, but preventing any significant lost motion. The cradles on each lifter are sufficiently offset along the circumference of the associated annular weight to hold the weight securely and not to permit rocking movement of the weight. The cams are provided with a sufficient number of lobes to permit any desired combination of the weights 19,20,21 to be lifted from the arms 18 by rotating a knob 41 mounted on an axial end portion of the shaft 25 which is normally outside the non-illustrated balance housing. A click stop arrangement not visible in FIG. 1 releasably holds the shaft 25 in each of the angular positions corresponding to desired weight arrangements. It consists of a circular disc on the portion of the shaft 25 remote from the knob 41 and provided with circumferential notches and a leaf spring on the fixed balance structure sequentially engaged in the notches when the shaft 25 is turned, such an arrangement being known from the afore-mentioned U.S. Pat. No. 3,193,036.

Figure 2:
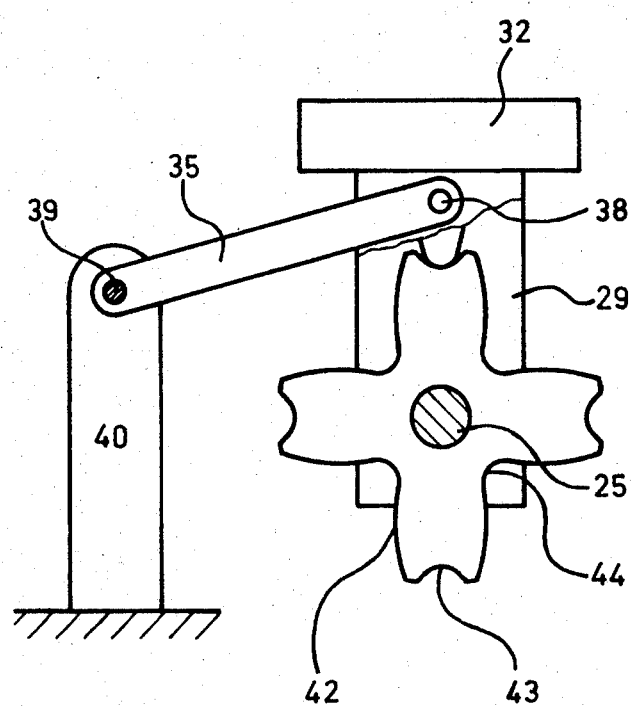

A modified cam arrangement not requiring a separate click-stop device is shown in FIG. 2 with reference to the lifter 29. The lifter is suspended from a column 40, a portion of the stationary supporting structure, by means of links 35 and pivot pins 38,39, as described above, and straddles the shaft 25. The projection 36 depending from the top plate 32 of the lifter cooperates with a modified cam 42. Circumferentially open, shallow recesses 43 in the radially outermost portions of the four cam lobes and corresponding recesses 44 in the four portions of the cam nearest the axis of rotation prevent accidental movement of the shaft 25 out of eight angular positions spaced 45° apart. By forming similar recesses in the other cams, the shaft 25 may be provided with a click stop arrangement having as many steps during each revolution of the knob 41 as may be desired. The projection 36 is yieldably and releasably retained in the recesses 43,44 by the gravitational load of the lifter 29 and/or of a weight held by the lifter in an inoperative position and transmitted by the cam 42 and the projection 36 to the shaft 25.

The precision balance of the invention combines the advantages of the balances disclosed in the two afore-mentioned patents while avoiding their shortcomings. The center of gravity of each weight is vertically aligned with the center of the weighing pan 17 in all operative conditions of the balance. Unequal loading an uneven wear of the two main bearings 8 cannot be caused by the weights 19,20,21. Resilient dampers are not needed.

The weights are located outside the parallelogram linkage for the weighing pan, and the dimensions of the parallelogram are not affected by resilient deformation of links when weights are added or withdrawn.

The overall dimensions of the balance are relatively small, and the screen from which weights of less than 100 g are read may be located closely adjacent the weighing pan 17 and the control knob 41. Yet, the relatively large and heavy annular weights required for the expected range of the balance are readily accomodated without crowding other balance elements. The light beam from the scale 12 to the non-illustrated screen is very short, and projection errors are therefore safely avoided.

The compactness of the balance without interference of its several operating elements with each other becomes possible by horizontally offsetting the vertical axis of the weighing pan stem 16 from the vertical main portion of the pan carrier member 9. It thus becomes possible to align the cam shaft 25 with the center of the pan, and the heavy weights 19,20,21 can be raised and lowered in a simple, yet effective manner.

The strip 11 permits the distance between the main bearing 5 and the scale 12 to be made much greater than the length of the longer arm of the balance beam. The beam need not be long to provide the desired long radius of angular movement for the scale, and the overall dimensions of the balance are thereby reduced. The slim strip 11 can be accomodated between other elements of the balance where the balance beam would not find space.

A mode of operation applicable heretofore only to analytical balances of limited weight-bearing capacity and having weighting pans downwardly suspended from the associated secondary bearings has thus been made available in precision balances having built-in weights totalling well over one pound and provided with a weighing pan arranged above the associated suspension bearing.

While the invention has been described with particular reference to preferred embodiments, it should be understood that it is not limited to the examples of the invention herein chosen for the purpose of the disclosure, and is to be construed broadly and limited solely by the scope and spirit of the appended claims.

What is claimed is:

1. A precision balance comprising, in combination:
   a. a support;
   b. a balance beam mounted on said support for angular movement about a main pivot axis;
   c. indicating means for indicating the angular position of said beam on said support;
   d. a pan carrier member suspended on said beam for angular movement about a secondary pivot axis;
   e. linking means hingedly connecting respective portions of said carrier member and of said support and therewith constituting paralellogram linkage means for maintaining the orientation of said pan carrier member relative to said support during said angular movements of said beam and of said pan carrier member,
      1. said linking means being downwardly spaced from said pivot axes in the normal operating position of said balance;
   f. a weighing pan mounted on said pan carrier member;
   g. an annular weight; and
   h. lifting means on said support for moving said weight toward and away from a loading position in which said weight rests on said pan carrier,
      1. said weight when in said loading position and said weighing pan being located above said secondary pivot axis in said normal operating position of said balance.

2. A balance as set forth in claim 1, wherein said beam has two arms extending from said main pivot axis in opposite directions, said pan carrier member being suspended from one of said arms, and said indicating means including an indicia carrier fixedly connected to the other arm of said beam and offset from said pan carrier member in a direction away from said main pivot axis.

3. A balance as set forth in claim 2, wherein said indicating means further include a light source and optical means for projecting a light beam of said light source through said indicia carrier and said optical means.

4. A balance as set forth in claim 1, further comprising at least one additional annular weight, said lifting means including means for individually lifting said weights from respective loading positions in which said weights rest on said pan carrier and are located above said secondary pivot axis in said normal operating position of said balance, said weights being coaxial in said loading positions and during the moving thereof toward and away from said loading positions, said weights having a combined weight substantially greater than 1 pound.

5. A balance as set forth in claim 4, wherein said pan carrier member has a main portion elongated transversely of said beam and connecting said balance beam to said linkage means, the common axis of said annular weights being offset from said main portion in a direction away from said secondary pivot axis.

6. A balance as set forth in claim 1, wherein said weight has an axis passing through said pan substantially in the center thereof in said loading position of said weight and during said moving of said weight by said lifting means.

7. A balance as set forth in claim 6, further comprising a second annular weight substantially coaxial with said first-mentioned weight, said lifting means including means for moving said second weight toward and away from a loading position in which said second weight rests on said pan carrier.

8. A balance as set forth in claim 7, wherein said weights extend substantially in a common plane perpendicular to the common axis thereof when in the respective loading positions.

9. A balance as set forth in claim 1, wherein said lifting means include a shaft rotatably mounted on said support, a lifter member engageable with said weight, and cammingly cooperating means on said shaft and on said lifter member for moving said lifter member into engagement with said weight and for thereby moving said weight from said loading position into an inoperative position in response to rotation of said shaft into a predetermined position, said weight in said inoperative position resting on said lifter member, and said cooperating means transmitting the load of said weight to said shaft.

10. A balance as set forth in claim 9, further comprising click stop means responsive to the transmitting of said load by said camming means for releasably holding said shaft in said predetermined position.

11. A balance as set forth in claim 9, further comprising knob means on an end portion of said shaft for manually turning the same, said indicating means further including a light source and optical means for projecting a light beam substantially parallel to the axis of said shaft in a direction toward said end portion, and an indicia carrier partly permeable to said light beam and mounted on said balance beam for movement in a path which intersects said light beam.

* * * * *